W. H. White.
Composite Roof.
Nº 34,543.   Patented Feb. 25, 1862.
Fig. 1.
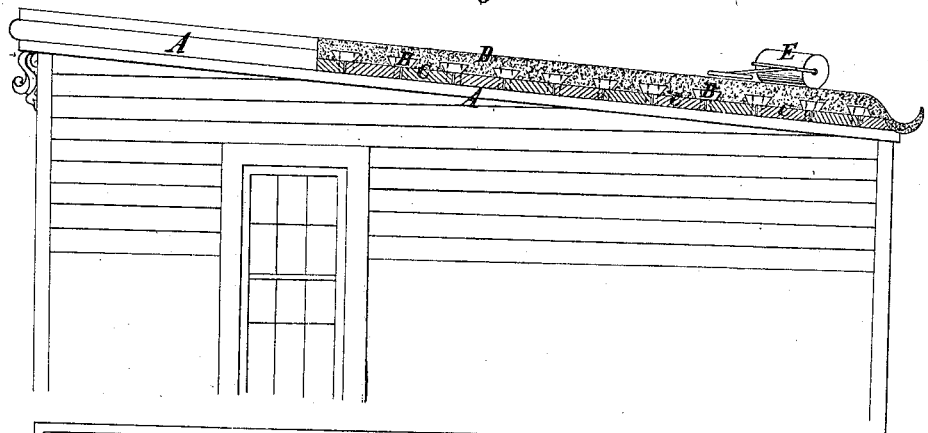
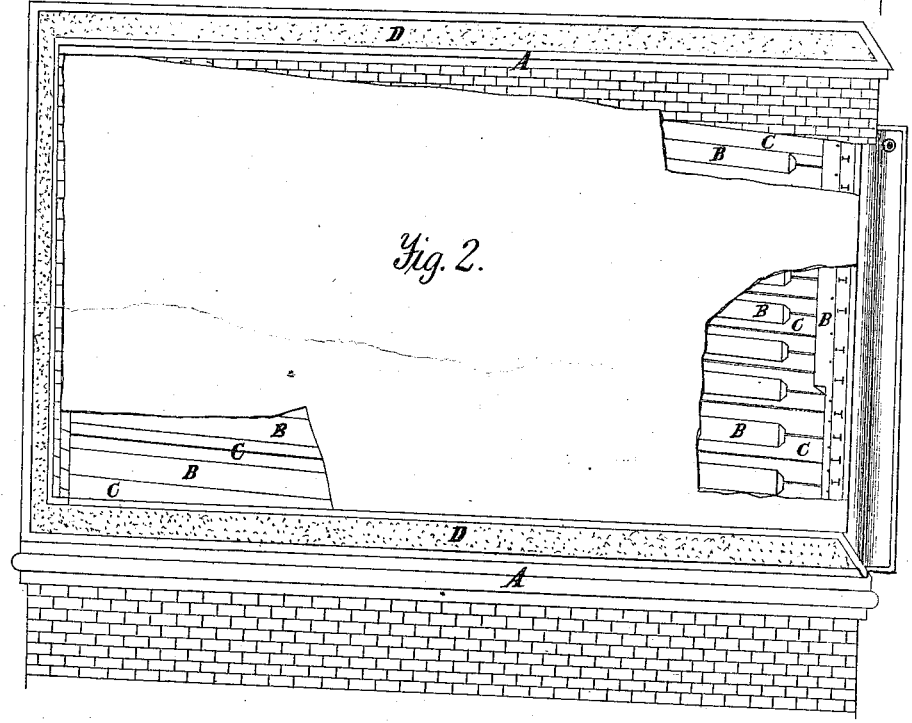
Fig. 2.
Witnesses.
Platt Smith
William J. Lovell.
Wells H. White
Inventor.

UNITED STATES PATENT OFFICE.

WELLS H. WHITE, OF DUBUQUE, IOWA.

IMPROVED ROOFING.

Specification forming part of Letters Patent No. 34,543, dated February 25, 1862.

*To all whom it may concern:*

Be it known that I, WELLS H. WHITE, of Dubuque, in the county of Dubuque, in the State of Iowa, have invented a new and useful roofing material and a filling-in for side walls and ceilings of outhouses and a new way of fastening the same onto buildings; and I do hereby declare that the following is a full and exact description thereof, reference being had to the accompanying drawings, and to the letters of reference marked thereon.

The nature of my invention consists of the following combination of materials: To form the first coating which is applied to the sheeting of the roof, I dissolve common salt in hot water, and thus make a saturated solution of common salt. This, when applied hot to the rough sheeting-boards of the roof, will soon become dry, forming a white crystallized covering of salt. This is coating No. 1, and renders the roofing partially fire-proof from the under side and prevents the roof from heating in summer from the same side. I then form a composition I call "coating No. 2" by taking two parts of good coarse sharp sand (or very fine gravel) and one part of coal-ashes and mix them together with coal-tar thoroughly till the whole mass is about the consistance of wet sugar. I then let this mixture stand about three days, and then spread it onto the sheeted roof over No. 1 till the whole is covered evenly over about one inch deep, and then I roll it down with a stone roller weighing one hundred pounds. I then take one part of common salt (dried) and one part of coal-ashes and mix with coal-tar, as in coating No. 2, and spread it on coating No. 2 evenly and one-half an inch in thickness. This I call "coating No. 3." I then take of the mixture No. 2 and spread another coating over the whole about one inch in thickness, and then roll the whole over again firmly with the stone roller until the whole mass is perfectly solid and smooth. I then paint the whole over with one coat of mineral paint mixed with linseed-oil. The oil in the paint, forming a chemical combination with the tar, keeps the surface of the mixture from drying too fast for the body of the mixture. Thus all dries about the same time, and the whole in a few weeks becomes as solid as stone.

The different coatings combined as above form a roofing which possesses the following advantages: It is perfectly water-proof, fire-proof, does not contract in winter nor expand in summer, and will last twice or thrice as long as tin or sheet-iron roofing. It is perfectly smooth on the surface, and consequently the water running from it is as fit for drink or washing as that from a tin or shingle roof. The salt in the third coating keeps the mixture from heating too much in the summer and adds to its fire-proof qualities. The painting I do not deem indispensable to the durability of this composition, but only as aiding in the slower hardening of the surface until all is hard alike.

Figure 1 in the drawings represents a sectional view of the roofing of a frame building, showing the material as applied and the way of fastening the same to the sheeting—viz., by dovetail strips of boards, iron, or other material, as seen by the letter B, and nailed to the sheeting C. The strips may run either way, up and down or crosswise the sheeting, or along and over the cracks of the sheeting. Letters A represent a part of the cornice as covering a part of a sectional view of the roofing. Fig. 2 represents a brick building as partially covered with this composition, and with the same letters of reference indicating the same things as in Fig. 1.

I do not claim the composition of coal-tar, wood-ashes, and sand as new.

What I claim as my invention, and desire to secure by Letters Patent, is—

1. The roof constructed of the materials and in the manner substantially as described.
2. The dovetail fastening, as described, for the purpose set forth.
3. The combination of common salt, sand, coal-tar, and coal-ashes to form a roof in the manner above specified.

WELLS H. WHITE.

Witnesses:
 WM. G. LOVELL,
 PLATT SMITH.